United States Patent [19]

Laue

[11] 4,354,353
[45] Oct. 19, 1982

[54] COMPRESSION ROD ASSEMBLY

[75] Inventor: Charles E. Laue, Wilmette, Ill.

[73] Assignee: Hamilton-Pax, Inc., Chicago, Ill.

[21] Appl. No.: 113,064

[22] Filed: Jan. 17, 1980

[51] Int. Cl.³ .............................................. B60T 13/20
[52] U.S. Cl. ................................... 60/554; 91/369 A; 403/220
[58] Field of Search ...................... 60/553, 554, 547 R; 91/369 R, 369 A, 369 B; 403/220, 227

[56] References Cited

U.S. PATENT DOCUMENTS

| | | | |
|---|---|---|---|
| 3,132,567 | 5/1964 | Ingres | 91/369 A |
| 3,712,177 | 1/1973 | Bach | 91/369 A |
| 4,233,884 | 11/1980 | Weiler | 91/369 B |
| 4,271,670 | 6/1981 | Ohmi | 60/554 |

*Primary Examiner*—Abraham Hershkovitz
*Attorney, Agent, or Firm*—Walter L. Schlegel, Jr.

[57] ABSTRACT

A compression rod assembly with its button end in tight engagement with a valve body of an automotive power brake unit in a socket of said body having a flow hole at the inner end of the socket has a plunger at the opposite end of said assembly in tight engagement with the piston of a master brake fluid cylinder. The button end of said assembly comprises a hollow button with an internal hollow boss and an annular space therearound. A resilient disc with its diameter complementary to the internal diameter of the button and tightly fitted therein projects from the button to engage the valve body around the flow hole, and a noncompressible disc is similarly fitted into the button, bearing against the boss and the inner side of the resilient disc. A rod is press-fitted at one end into the hollow boss bearing against the inner end thereof and the opposite end of the rod has a plunger threaded therein, the plunger having a head in said engagement with the master brake cylinder piston.

12 Claims, 14 Drawing Figures

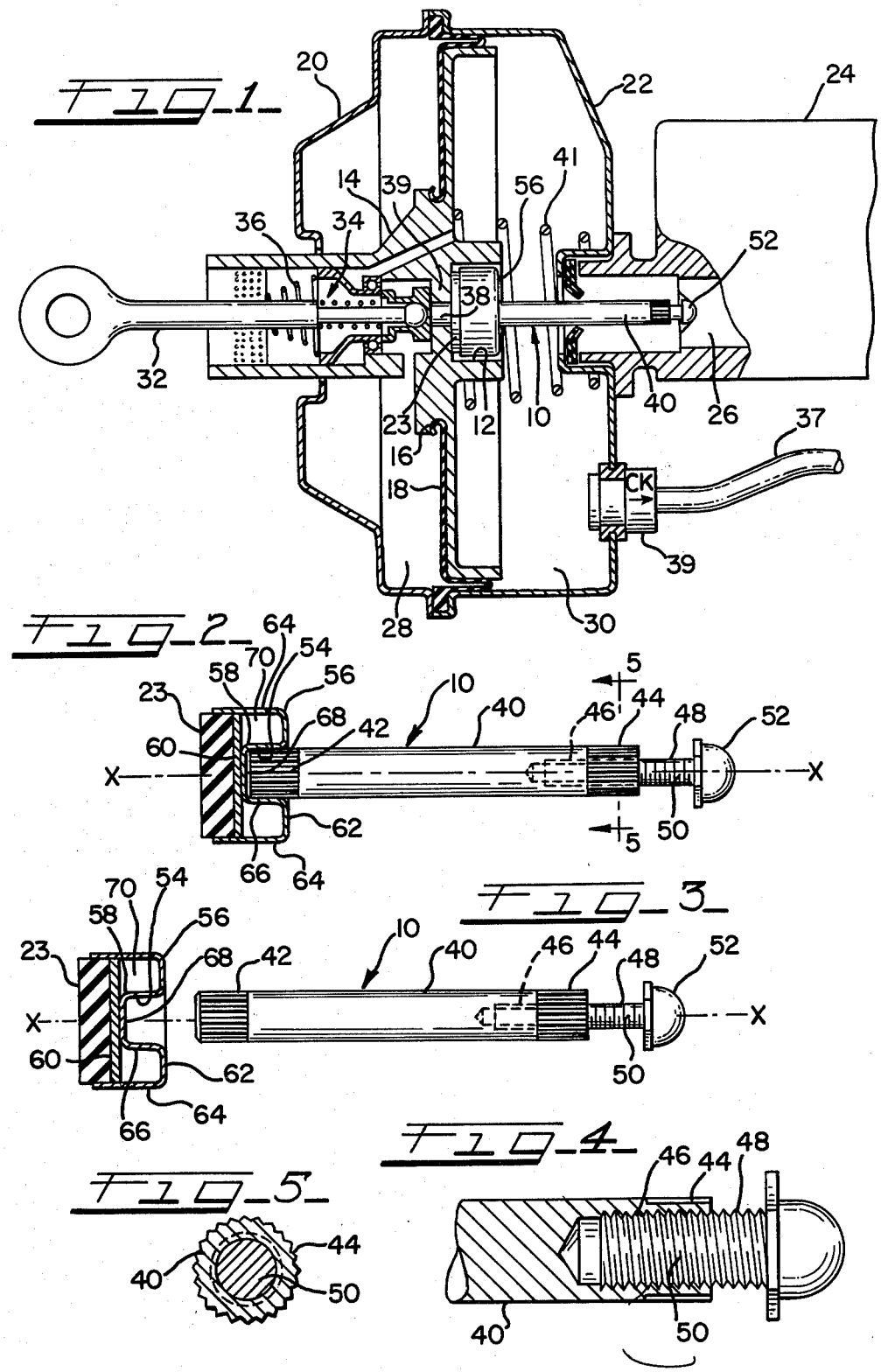

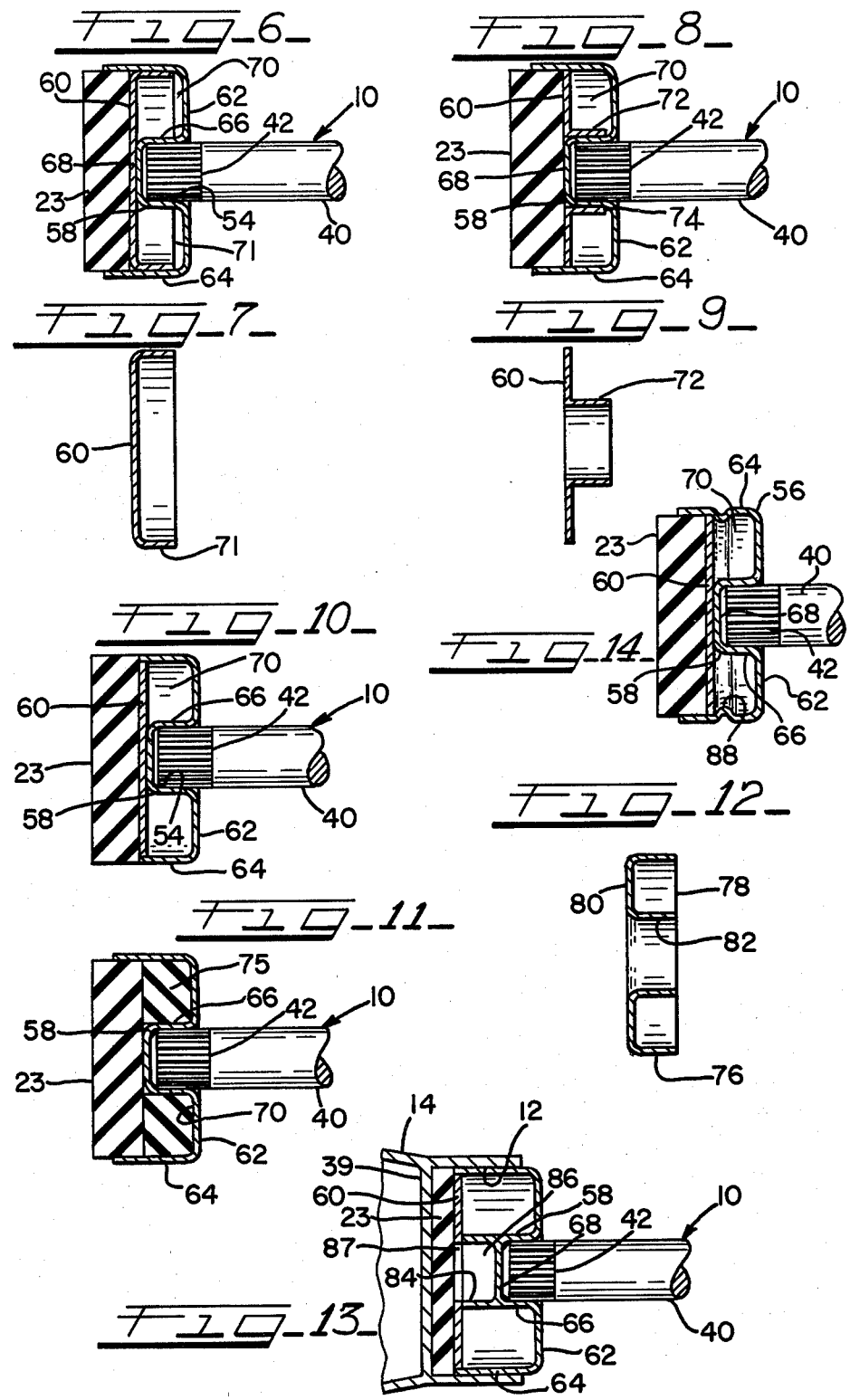

COMPRESSION ROD ASSEMBLY

This invention relates to power brakes for automotive vehicles and more particularly to such a brake wherein an annular resilient diaphram is clamped around its outer perimeter by a pair of annular housing or shell members defining spaced vacuum chambers at opposite sides of the diaphram. The diaphram has a central opening tightly clamping an annular valve body in an airtight snap fit within an annular groove thereof. The valve body is urged into one of the vacuum chambers in response to pressure of an operator's foot on the brake pedal urging a push rod into the valve body and thereby urging the valve body against a novel compression rod assembly which in turn actuates the piston of a conventional master cylinder containing liquid which actuates the pistons of the wheel brakes.

As the valve stem is urged into the valve body, atmospheric pressure is admitted to one of the chambers while the other chamber containing the compression rod assembly is under vacuum. This causes atmospheric pressure to apply the wheel brakes in response to very slight pressure on the brake pedal.

The present invention relates to the compression rod assembly which according to prior art practices consisted of a solid steel rod having its outer diameter splined at its ends. One of the splined ends was pressfitted into a hole of a solid steel cylindrical button and the other splined end afforded a grip on the rod while threading a plunger screw into that end of the rod is interference threaded engagement therewith to adjust the final length of the compression rod assembly during installation thereof with the plunger tightly seated against the piston of the master cylinder and the button tightly seated against a complementary rubber disc in a complementary recess of the valve body.

A primary objective of the present invention is to reduce the weight of the compression rod assembly as part of an overall objective to reduce the entire weight of the vehicle.

Another object of the invention is to reduce the cost of the compression rod assembly without reducing its efficiency as demonstrated in approximately eighty million units in service to date without a single failure in service.

Still another object of the invention is to simplify final mounting of the compression rod assembly by including the rubber disc as a component of the compression rod assembly.

The foregoing and other objects of the invention will become apparent from a consideration of the following specification and the accompanying drawings, wherein:

FIG. 1 is a schematic axial sectional view, partly in elevation, of a power brake unit embodying the novel compression rod assembly;

FIG. 2 is a side elevational view of a preferred embodiment of the novel compression rod assembly, with the novel button in axial section along the longitudinal central axis of the assembly;

FIG. 3 is a partially exploded view of the assembly shown in FIG. 2 with the button in position for assembly with the rod;

FIG. 4 is an enlarged partial sectional view on said axis showing the plunger threaded into the rod and showing the plunger head in elevation;

FIG. 5 is an enlarged cross-sectional view on line 5—5 of FIG. 2;

FIGS. 6 and 7 are partial axial sectional views corresponding to FIGS. 2 and 3 but showing a modification of the invention;

FIGS. 8 and 9 correspond to FIGS. 6 and 7 but showing another modification of the invention;

FIG. 10 is a partial axial sectional view corresponding to FIG. 2 but showing still another modification of the invention;

FIG. 11 is a partial axial sectional view corresponding to FIG. 2 but showing still another modification of the invention;

FIG. 12 is an axial sectional view of a modified washer for the embodiment of FIG. 11;

FIG. 13 is a partial axial sectional view corresponding to FIG. 2 showing also in section a fragmentary portion of the power brake valve body and disclosing yet another modification of the invention; and FIG. 14 is a partial sectional view corresponding to FIG. 2 but disclosing still another modification of the invention.

Describing the invention in detail and referring first to FIG. 1, the power brake unit is conventional except for my novel compression rod assembly generally designated 10 (hereinafter described in detail), the button end of which is received in a complementary cylindrical recess or socket 12 of an annular valve body 14 which has an annular recess or groove 16 having an air-tight snap fit with the inner diameter of an annular resilient diaphram 18, the outer diameter of which is clamped by a pair of annular shell or housing members 20 and 22. The socket 12 contains a rubber disc 23.

The plunger end 52 of my novel assembly 10 extends into a conventional master cylinder 24 removeably attached to the shell 22, with the master cylinder piston 26 tightly engaged with said plunger end, as hereinafter described in detail, for actuation thereby.

The diaphram 18 defines spaced vacuum chambers 28 and 30 within the shells 20 and 22, respectively, both of said chambers being connected to the usual manner to intake manifold (not shown) of the vehicle's internal combustion engine through a hose 37 and check valve 39.

When pressure is applied by the operator to the brake pedal, a pedal or push rod 32 is urged into a conventional valve 34 against resistance of a compression spring 36 in the valve body 14. This movement of rod 32 causes conventional valve 34 to cut off communication between chambers 28 and 30 and a admit atmospheric pressure to chamber 28 causing the valve body 14 and diaphram 18 to exert that pressure against the novel compression rod assembly 10 which in turn actuates the piston 26 of the master cylinder.

When the engine (not shown) of the automotive vehicle (not shown) is running, air is drawn through hose 37 and check valve 39. This creates a vacuum in both chambers 28 and 30. When brake pedal rod 32 is urged into chamber 28 by depression of a brake pedal (not shown) chamber 30 remains under vacuum but atmospheric pressure is admitted to chamber 28 by valve 34 thus exerting that atmospheric pressure against the diaphram 36 which moves into chamber 30 along with valve body 14. Inasmuch as atmospheric pressure is of the order of 14 pounds per square inch at sea level, with a ten inch diameter diaphram 18 the braking pressure amounts to the order of 1000 pounds per square inch by the application of 10–18 pounds per square inch to the brake pedal.

As this actuation occurs, the rubber of disc 23 flows into a hole 38 of a wall 39 of the valve body 14 affording a seat for the disc 23 at the inner end of the socket 12. This is very important in that the braking force is caused to be proportionate to the pressure of the operator's foot on the brake pedal, thus giving the operator a sense of "feel" that would be lacking if such flowing of the rubber of disc 23 did not occur.

Upon release of pedal rod 32 the valve 34 closes, cutting off atmospheric pressure from chamber 28 and reconnecting it to chamber 30 so that chamber 28 is again under vacuum so that the resiliency of the diaphram 18 and a return spring 41 returns the parts to no-brake position shown in FIG. 1.

Describing the novel compression rod assembly 10 in detail and referring first to FIGS. 2 and 3, a cylindrical rod or shaft 40 is splined at its ends as at 42 and 44 and is threaded as at 46 for interference threaded engagement with threads 48 of a screw or plunger 50 having a parti-spherical head 52 for engagement with the piston 26 (FIG. 1) of master cylinder 24 as heretofore described. The splining at 44 affords a convenient grip on rod 40 as the plunger is threaded into one end thereof during initial manufacturing assembly and is threaded further into or out of said end during final assembly in the power brake unit of FIG. 1.

The other splined end 42 of the rod 40 is afforded a force fit (FIG. 2) within a socket 54 of a hollow button 56, the socket being defined by a hollow boss 58 within the button 56. The boss 58 affords a seat for a non-compressible wall in the shape of a disc 60 formed of steel or any other non-compressible material such as bakelite snugly fitted into an axial annular wall 64 of button 56. The disc 60 in turn affords a seat for rubber disc 23 which is tightly fitted into wall 64 of the hollow button in tight engagement with disc 60 and may be secured to the button wall 64 and disc 60 in that position by adhesive if desired.

It should be noted that the novel hollow button 56 may be formed as a steel stamping which is much more economical to form than the prior art solid machined steel button, with the rubber disc 23 as an entirely separate part.

The stamping defining the hollow button 56, as best seen in FIG. 3, comprises an annular radial wall 62 which is substantially radial to the longitudinal axis x—x (FIG. 2) of rod 40 which is the longitudinal axis of assembly 10. The wall 62 is integrally connected at its radially outer perimeter to annular axial wall 64 which is substantially coaxial with axis x—x, and the radially inner perimeter of wall 62 is connected to annular wall 66 coaxial with wall 64.

The axially inner extremity of wall 66 is integrally connected to radially extending wall 68 which defines therewith the hollow boss 58.

It is vital that the rubber disc 23 in this embodiment extend axially beyond annular wall 64 and thus is only partially confined within the hollow button 56 because this arrangement permits the rubber disc to be compressed to flow into hole 38 of valve body 14 for the purpose heretofore described.

It is also important that the force path from the resilient disc 23 to the piston 26 is along the longitudinal axis x—x of the assembly 10 and is entirely through noncompressible structure comprising the noncompressible disc 60, the button wall 68, the rod 40, the plunger 50 and the head 52, all of which are noncompressible under the forces encountered in automotive service.

Another important feature of the invention is the provision of an annular space 70 around the hollow boss 58 defined by walls 62, 64 and 66 of the hollow button 56. This affords a lighter, more economical structure than the prior art buttons of such compression rod assemblies. The noncompressible disc 60 prevents flow of the resilient disc 23 into the space 70.

FIGS. 6 and 7 show a modification of the invention wherein parts corresponding to those of FIGS. 1-5 are identified by corresponding numerals. In this embodiment, the noncompressible disc or wall 60 is formed on its diameter with an annular flange 71 which is snugly engaged with the inner diameter of the axial button wall 64 to increase rigidity of the disc 60. In all other respects the structure is the same as in FIGS. 1-5.

FIGS. 8 and 9 show another modification of the invention wherein parts corresponding to those of FIGS. 1-5 are identified by corresponding numerals. In this modification, the disc or wall 60 is in the form of a washer having an annular flange 72 on its inner diameter, the flange 72 being snugly fitted around the hollow boss 58 and being seated at 74 against the radial button wall 62.

FIG. 10 shows still another modification of the invention, wherein parts corresponding to those of FIGS. 1-5 are identified by corresponding numerals. In the modification of FIG. 10, the noncompressible disc or wall 60 is complementary in diameter to the inner diameter of axial button wall 64 and is snugly fitted therein and is seated against the hollow boss 58 as in FIGS. 1-5 but the outer flat surface of disc 60 is flush with the outer edge of button wall 64 so that the resilient, compressible disc 23 is not necessarily part of the assembly 10 and may be a loose part. However, if desired, the resilient disc 23 may be secured by an adhesive to the flat outer surface of disc 60 and the outer edge of axial annular button wall 64 so that the resilient disc 23 is part of assembly 10. In all other respects, the modification of FIG. 10 is the same as the preferred embodiment of FIGS. 1-5.

FIGS. 11 and 12 show yet another modification of the invention wherein parts corresponding to those of FIGS. 1-5 are identified by corresponding numerals. In the modification of FIGS. 11 and 12, the noncompressible disc may be eliminated and the inner side of the compressible disc 23 may be seated against the hollow boss 58 and against a rubber or bakelite washer 75 complementary in shape to, and snugly fitted, in the annular space 70 around the hollow boss 58. Inasmuch as the washer 75 fills space 70, the resilient disc 23 cannot flow into that space. FIG. 12 shows a modified washer 76 which may be substituted for washer 75. The washer 76 is in the form of an annular steel stamping adapted to seat along surface 78 against button wall 62 and adapted to seat at surface 80 against the resilient disc 23. The washer 76 has a central opening 82 complementary in form to, and adapted to be snugly fitted around the hollow boss 58 so that the washer 76 prevents flow of the resilient disc 23 into the space 70 around the hollow boss.

FIG. 13 shows still another modification of the invention wherein parts corresponding to those of FIGS. 1-5 are identified by corresponding numerals. In the modification of FIG. 13, the resilient disc 23 is seated at one flat side thereof against the outer flat side of the noncompressible disc wall or disc 60 and against the outer edge of axial button wall 64, as in FIG. 10, and may be secured thereto by an adhesive, if desired, as discussed in connection with FIG. 10. In the modification of FIG. 13, the resilient disc 23 seats against the valve body wall 39 as in FIG. 1, but the flow hole 38 in the wall 39 may, if desired, be eliminated as shown in FIG. 13.

For this reason, in the modification of FIG. 13, the noncompressible disc or wall 60 is seated against an annular flange 84 on the outer end of the hollow boss 58, said flange defining a flow space 86 into which the resilient disc 23 may flow through a central flow hole 87 in the noncompressible disc or wall 60.

In all other respects the modification of FIG. 13 is the same as that of FIGS. 1–5.

FIG. 14 shows still another modification of the invention and is identical with the embodiment of FIGS. 1 and 2 except that a bead 88 is formed in the wall 64 of the button 56. This bead affords abutment means for the disc or wall 60 when it is seated against the button wall 68, thereby preventing any tendency for the disc 60 to deflect into the cavity 70 when the resilient disc 23 is compressed in service as heretofore described. In FIG. 14 parts corresponding to those of FIGS. 1 and 2 are identical therewith and are identified by corresponding numerals.

What is claimed is:

1. In a compression rod assembly for tight engagement at its ends, respectively, with a diaphram-mounted valve body in a power brake cylinder around a flow hole in said body and with a piston in a master brake fluid cylinder; the combination of a hollow button having an annular radial wall, spaced inner and outer axial walls connected to the radial wall, a radial wall connected to the inner axial wall and defining therewith a hollow boss having a socket, said outer axial wall extending axially beyond said boss, a noncompressible disc having a diameter complementary to and snugly fitted against said outer axial wall along its inner diameter, said disc seated against said boss, a resilient disc having its outer diameter complementary to and snugly fitted against the inner diameter of said outer axial wall, said resilient disc seated at its inner side against the noncompressible disc and said resilient disc seated at its outer side against said valve body around its flow hole, a noncompressible rod having one end tightly fitted in said socket, and a noncompressible plunger threaded into the other end of said rod, said plunger having a head engaging the piston.

2. A compression rod assembly according to claim 1, wherein the noncompressible disc comprises an annular flange on its diameter snugly fitted against the outer axial wall.

3. A compression rod assembly according to claim 1, wherein the noncompressible disc comprises an annular flange within which the hollow boss is snugly fitted.

4. In a compression rod assembly to be positioned with one end in tight engagement with a piston of a master brake fluid cylinder and with the other end bearing against a diaphram-mounted power brake valve body in a socket thereof with a flow hole at the inner end of the socket; the combination of a compression rod, a plunger rigidly connected to said rod and having a head for said engagement with said piston, a hollow button having an internal hollow boss with an internal socket and having an annular empty air space therearound spaced from the socket, the other end of said rod being received in said socket, a resilient disc having its diameter complementary to and snugly fitted into said hollow button and extending axially outwardly therefrom to bear against the body around said flow hole, and means between said disc and said boss externally of said socket for preventing substantial flow of said resilient disc into said empty air space within the hollow button.

5. A compression rod according to claim 4 wherein said means comprise a noncompressible disc having its diameter complementary to and snugly fitted in said hollow button in engagement with the resilient disc and the inner end of said boss and wherein the button is provided with abutment means projecting radially inwardly for engagement with the noncompressible disc along the inner side thereof.

6. A compression rod assembly according to claim 4 wherein the means are characterized by a noncompressible annulus seated against said resilient disc along its inner side and having an annular flange snugly fitted around said boss and bearing against the button at the inner end of said flange.

7. In combination with an automotive power brake unit having a resiliently mounted valve body containing a socket with a flow-hole at its inner end; a hollow button having a hollow boss and an internal annular empty air space surrounding said boss, a compression rod received at one end into the outer end of the hollow boss, a non-compressible disc having its diameter complementary to and snugly fitted into the hollow button in engagement with the inner end of said boss, a resilient flowable disc engaged with the outer side of said noncompressible disc and engaged with the valve body around said flow-hole, means within the button engaged with the inner side of said noncompressible disc for supporting it against thrust by said resilient disc, and a plunger on the opposite end of said rod for engagement with an associated piston of a master brake fluid cylinder.

8. In combination with a diaphram-mounted power brake valve body having a socket partly defined by a wall of said body at the inner end of said socket; the combination of a compression rod assembly comprising a hollow button having an internal hollow boss and an internal annular space around the boss, a compression rod press-fitted into said hollow boss, and a noncompressible disc comprising a wall seated at one side thereof against said boss, and a resilient disc seated at one side thereof against the opposite side of said noncompressible disc wall, said resilient disc seated at its opposite side against said first-mentioned wall, said noncompressible disc wall having its outer diameter complementary to and snugly fitted against the inner diameter of the button to prevent flow of the resilient disc into said space, and a flow hole through at least one of said walls intersected by the longitudinal axis of the assembly to accommodate flow of said resilient disc into said hole when under compression between said walls said button being provided with abutment means projecting radially inwardly toward the boss for engagement with the noncompressible disc wall along the side thereof seated against the boss.

9. A combination according to claim 8 wherein the flow-hole extends through the disc wall.

10. In a compression rod assembly for tight engagement at its ends, respectively, with a piston in a master brake fluid cylinder and with a resiliently mounted valve body in a power brake cylinder against a seat wall of said body; the combination of a hollow button having an annular radial wall, spaced inner and outer axial walls connected to the radial wall and defining therewith an empty annular air space, a radial wall connected to the inner axial wall and defining therewith a hollow boss having a socket, a noncompressible disc comprising a noncompressible seat wall with a diameter complementary to and snugly seated against said outer axial wall along its inner diameter, said disc wall having one side seated against said boss to close the air space, a resilient disc seated against said outer axial wall, said resilient disc seated along its inner side against the other side of the noncompressible disc seat wall, and said resilient disc seated at its outer side against said body seat wall, a flow hole through at least one of said seat walls intersected by the longitudinal axis of the assembly, a noncompressible rod having one end received in said socket, and a noncompressible plunger connected to the opposite end of said rod, said plunger having a head engaging the piston.

11. An assembly according to claim 10 wherein the outer axial wall has abutment means engaged with the disc seat wall along said one side thereof.

12. In a compression rod assembly for engagement at its ends, respectively, with a valve body in a power brake cylinder around a flow hole in said body and with a piston in a master brake fluid cylinder; the combination of a hollow button having an annular radial wall, spaced inner and outer axial walls connected to the radial wall, a radial wall connected to the inner axial wall and defining therewith a hollow boss having a socket, said outer axial wall extending axially beyond said boss, a noncompressible disc having a diameter complementary to and seated against said outer axial wall along its inner diameter, said disc seated against said boss, a resilient disc having its outer diameter complementary to and seated against said outer axial wall, said resilient disc seated at its inner side against the noncompressible disc, and said resilient disc seated at its outer side against said valve body around said flow hole, a noncompressible rod having one end received in said socket, and a noncompressible plunger connected to the outer end of said rod, said plunger having a head engaging said piston.

* * * * *